(12) United States Patent
Vilato et al.

(10) Patent No.: US 9,302,934 B2
(45) Date of Patent: Apr. 5, 2016

(54) GLASS-CERAMIC PLATE AND ITS MANUFACTURING PROCESS

(75) Inventors: Pablo Vilato, Paris (FR); Caroline Faillat, Belleau (FR); Marie-Helene Rouillon, Chateau-Thierry (FR)

(73) Assignee: EUROKERA S.N.C., Chateau-Thierry (FR)

( * ) Notice: Subject to any disclaimer, the term of this patent is extended or adjusted under 35 U.S.C. 154(b) by 1741 days.

(21) Appl. No.: 12/445,585

(22) PCT Filed: Oct. 15, 2007

(86) PCT No.: PCT/FR2007/052152
§ 371 (c)(1),
(2), (4) Date: Apr. 15, 2009

(87) PCT Pub. No.: WO2008/047034
PCT Pub. Date: Apr. 24, 2008

(65) Prior Publication Data
US 2010/0301035 A1 Dec. 2, 2010

(30) Foreign Application Priority Data

Oct. 16, 2006 (FR) .................................... 06 54285

(51) Int. Cl.
| | | |
|---|---|---|
| *H05B 3/68* | (2006.01) | |
| *B32B 17/00* | (2006.01) | |
| *C03C 17/23* | (2006.01) | |
| *C03C 17/25* | (2006.01) | |
| *C03C 17/34* | (2006.01) | |
| *C03C 17/42* | (2006.01) | |

(52) U.S. Cl.
CPC ................ *C03C 17/23* (2013.01); *C03C 17/25* (2013.01); *C03C 17/256* (2013.01); *C03C 17/3411* (2013.01); *C03C 17/42* (2013.01); *C03C 2217/212* (2013.01); *C03C 2217/42* (2013.01); *C03C 2217/72* (2013.01); *C03C 2218/113* (2013.01); *C03C 2218/119* (2013.01)

(58) Field of Classification Search
CPC ...... C03C 17/23; C03C 17/25; C03C 17/256; C03C 17/3411; C03C 17/42; C03C 2217/212; C03C 2217/42; C03C 2217/72; C03C 2218/113; C03C 2218/119
USPC ................... 219/443.1–468.2; 501/2, 11–26; 428/210, 332–339, 426–442
See application file for complete search history.

(56) References Cited

U.S. PATENT DOCUMENTS

| | | | | |
|---|---|---|---|---|
| 5,070,230 | A | * 12/1991 | Osada et al. ................... | 219/203 |
| 5,137,779 | A | 8/1992 | Hinz et al. | |
| 5,270,517 | A | * 12/1993 | Finley ........................... | 219/203 |
| 5,716,712 | A | * 2/1998 | Schonig et al. ............... | 428/428 |
| 5,866,239 | A | * 2/1999 | Shimatani et al. ............ | 428/210 |
| 6,168,242 | B1 | * 1/2001 | Mokerji ........................ | 428/412 |
| 2004/0258947 | A1 | 12/2004 | Moelle et al. | |
| 2005/0172829 | A1 | 8/2005 | Shimatani et al. | |
| 2006/0093840 | A1 | 5/2006 | Christoph et al. | |
| 2006/0127699 | A1 | 6/2006 | Moelle et al. | |
| 2006/0246321 | A1 | 11/2006 | Molle et al. | |
| 2007/0056961 | A1 | 3/2007 | Shimatani et al. | |
| 2008/0190409 | A1 | 8/2008 | Demol et al. | |
| 2008/0264931 | A1 | 10/2008 | Vilato et al. | |

FOREIGN PATENT DOCUMENTS

| | | |
|---|---|---|
| DE | 10 2004 053 706 | 5/2006 |
| EP | 1 505 354 | 2/2005 |
| FR | 2 654 096 | 5/1991 |
| FR | 2 857 958 | 1/2005 |
| WO | 2004 026786 | 4/2004 |
| WO | 2005 120154 | 12/2005 |

\* cited by examiner

*Primary Examiner* — Sang Y Paik
(74) *Attorney, Agent, or Firm* — Oblon, McClelland, Maier & Neustadt, L.L.P.

(57) ABSTRACT

A glass-ceramic plate for covering or accommodating at least one heating element, wherein the plate is at least partly coated with at least one nanoscale layer based on a metallic material having a refractive index greater than the refractive index of the glass-ceramic.

14 Claims, No Drawings

GLASS-CERAMIC PLATE AND ITS MANUFACTURING PROCESS

The present invention relates to a glass-ceramic plate intended in particular for covering or accommodate heating elements, in particular intended to serve as a cooking plate (or hob), and to its manufacturing process.

The sales of glass-ceramic hobs have been continuing to grow over the last few years. This success is explained in particular by the attractive appearance of such hobs and by the ease of cleaning them.

It will be recalled that a glass-ceramic is originally a glass, called precursor glass, the specific chemical composition of which allows controlled crystallization to be induced by suitable heat treatments, called ceramization. This partly crystallized specific structure gives the glass-ceramic unique properties.

At the present time, there are various types of glass-ceramic plate, each variant being the result of extensive research and many tests, given that it is very difficult to make modifications to these plates and/or to the process for obtaining them without risking an unfavorable effect on the desired properties. To be able to be used as a hob, a glass-ceramic plate must generally have a transmission in the wavelengths in the visible range that is both low enough to mask at least some of the subjacent heating elements when not in use and high enough so that, for the sake of safety, the user can visually detect the heating elements when they are in operation. It must also have a high transmission in the wavelengths of the infrared range.

Most current plates are of dark color, in particular black, but there are also plates of lighter color (in particular white having, for example, a haze of at least 50%, as described in patent FR 2 766 816), or even transparent plates provided with opacifying coatings. Among known (functional and/or decorative) coatings for glass-ceramic plates, there are conventionally enamels, based on glass frits and pigments, and certain paints resistant to high temperature, based for example on alkyd resins. In particular, enamels have the advantage of being able to be deposited on the precursor glass (or mother glass or green glass) before ceramization and of being able to be baked during the ceramization, and also have the advantage of being able to withstand high temperatures (allowing the use of various heating means for the plate). However, they have the drawback of permitting only a single deposition (no enamel superposition is possible) and with a small thickness, otherwise there is a risk in particular of the enamel flaking off and of damaging the glass-ceramic plate. As regards paint, this may be applied (if so required) as several layers. However, it must be applied after ceramization (and therefore requires an additional baking operation) and remains limited to plates for induction heaters (operating at lower temperature).

More recently, glass-ceramic plates have also been proposed with coatings based on reflective layers deposited by magnetron cathode sputtering or based on glass batch materials incorporating special-effect pigments (aluminum oxide or mica flakes coated with metal oxides), thus making it possible to produce contrasted regions (in particular, glossy regions contrasting with regions that are more matt) providing an esthetic and/or technical effect. However, the coatings based on reflective layers deposited by magnetron sputtering are more expensive and their manufacture is more complex (or tricky in the case of forming patterns requiring complicated masking operations) and is carried out after ceramization, as subsequent work, these coatings moreover generally being used only with induction heating elements and generally not being suitable for the use of touch-sensitive control elements. As regards coatings based on a glass batch with special effect pigments, apart from a reflecting effect generally reduced by the ceramization, they have the same drawbacks as the abovementioned enamels.

The object of the present invention was to obtain plates having a functional and esthetic appearance, in particular and preferably a contrasted appearance due to the presence of reflective regions, more simply and/or advantageously than mentioned above, in particular with a coating that does not have the above drawbacks.

The novel plate according to the invention is a glass-ceramic plate intended for example to cover or accommodate at least one heating element, in particular intended to serve as a cooking plate (or hob), said plate being at least partly coated with at least one nanoscale layer based on a metallic material having a refractive index greater than that of the glass-ceramic.

The term "glass-ceramic plate" is understood hereafter to mean not only plates made of actual glass-ceramic but also plates made of any other similar material that is resistant to high temperature and has a zero or almost-zero expansion coefficient (for example less than $15 \times 10^{-7} K^{-1}$). However, the plate is preferably an actual glass-ceramic plate.

The term "nanoscale layer" is understood to mean a layer having a thickness not exceeding 100 nm, preferably 50 nm (for comparison, the thickness of an enamel layer is generally 2.5 to 5 µm after baking and the thickness of a magnetron sputtered layer is generally greater than 100 nm. Advantageously, the particles of the metallic material forming the layer initially have (before agglomeration) a nanoscale size, in particular they have a mean diameter of less than 100 nm (with at least 90% of said particles generally having a diameter of less than 100 nm) and preferably less than 50 nm.

The expression "layer based on a metallic material" is understood to mean that the layer is formed predominantly (at least 50%, advantageously at least 95% and generally around 100% by weight) of said material, said layer generally and advantageously consisting of said material (100% by weight). The term "metallic material" is understood in the layer to mean one or more compounds chosen from inorganic compounds of a metal element (titanium, tin, zirconium, aluminum, iron, etc.) such as metal oxides, metal sulfides and metal nitrides (or oxynitrides), preferably chosen from metal oxides. Since the refractive index of the glass-ceramic is around 1.54, the nanoscale layer defined according to the invention is preferably formed from (or based on) aluminum oxide $Al_2O_3$ (refractive index n around 1.77) and/or tin dioxide $SnO_2$ (refractive index n around 1.85) and/or zirconium dioxide $ZrO_2$ (refractive index n around 2) and/or titanium dioxide $TiO_2$ (refractive index n around 2 to 2.2) and/or iron oxide $Fe_2O_3$ (refractive index n around 2.9 to 3.2) and, particularly preferably, it is formed from (or based on) titanium dioxide or iron oxide $Fe_2O_3$.

The layer defined above generally covers at least one part of one face of the plate, as will be explained in detail later, and may advantageously cover the entirety of said face.

The present invention also relates to the composition applied to the plate so as to obtain the layer defined above, this composition comprising at least the aforementioned metallic material and/or one or more precursors of said material.

Preferably, the applied composition includes at least one organic material for bonding the particles of the aforementioned metallic material to the plate and/or is applied jointly (in successive depositions) with another composition including said organic material. Where appropriate, the applied composition may also include an organic medium, in particular for adjusting its viscosity for deposition on the plate.

The organic material for bonding the particles of metallic material is generally in polymeric form and may incorporate said metallic material (for example in the case of organometallic compounds, which then constitute precursors of said metallic material) or may simply form a binder for said particles, this organic material being in all cases subsequently eliminated (in particular burnt off) during the baking, so as to give the layer defined according to the invention (where appropriate, the medium present in the composition generally being eliminated beforehand by drying, as will be explained in detail later).

As mentioned above, the particles of metallic material may derive from one or more precursors (organometallic silicates, sulfates, phosphates, borates, selenates, nitrates, carbonates, titanates, etc.) which release the particles during baking of the layer) and/or may have been formed beforehand using various known processes (before their addition to the composition applied to the plate). In the latter case, they are preferably particles obtained pyrogenically (for example by passing an organometallic compound through a flame in the presence of oxygen, so as to remove the organic part of the compound), this process making it possible in particular to obtain nanoscale particles.

The composition deposited on the plate may also include one or more adhesion promoters (such as silanes), one or more agents for adjusting the viscosity and allowing it to be deposited on the plate, etc. This composition takes the form of a solution (or a sol-gel) which is stable and of liquid-to-pasty consistency (in particular it takes the form of a screen-printable paste for the purpose of depositing it by screen printing).

The layer obtained and defined according to the invention may optionally include, apart from the metallic material, one or more compounds formed, where appropriate, by the precursors of said material (for example traces of carbon), etc.

The present invention also relates to a process for manufacturing the plate according to the invention, in which the above composition is applied, preferably by screen printing, to the precursor glass plate before ceramization, said composition being baked during the ceramization cycle.

As a reminder, the manufacture of glass-ceramic plates generally takes place as follows: the glass, having a composition chosen for forming the glass-ceramic, is melted in a melting furnace, the molten glass is then rolled into a standard ribbon or sheet, by making the molten glass pass between rolling rolls, and the glass ribbon is cut to the desired dimensions. The plates thus cut are then ceramified in a manner known per se, the ceramization consisting in firing the plates with the thermal profile chosen to convert the glass into the polycrystalline material called "glass-ceramic", the expansion coefficient of which is zero or almost zero and which is resistant to a heat shock possibly up to 700° C. The ceramization generally comprises a step of progressively raising the temperature up to the nucleation range, generally in the vicinity of the glass conversion range, a step of passing through the nucleation range over several minutes, a further progressive rise in the temperature up to the ceramization hold (level, plateau) temperature, the ceramization hold temperature being maintained for several minutes, followed by rapid cooling down to room temperature. Where appropriate, the process also includes a cutting operation (generally before ceramization), for example using a water jet, mechanical scoring using a scoring wheel, etc., followed by a fashioning operation (grinding, bevelling, etc.).

Preferably, the composition described above is deposited on the plate, in the form of a paste, by screen printing, the thickness of the wet film being for example around 5 to 20 μm. After the composition has been deposited, the coated precursor glass plate is dried (for example by infrared or in an oven), generally at temperatures of around 100 to 150° C., so as to evaporate the solvent (medium), to fix the coating and allow the plate to be handled, resulting in a dried coating which then has a thickness generally of around 1 to 5 μm, and it then undergoes a conventional high-temperature ceramization cycle (as mentioned earlier), the baking of the layer accompanying the conversion of the substrate, the resulting nanoscale layer generally having a thickness of around 10 to 100 nm, especially around 20 to 50 nm.

The nanoscale layer obtained (for example a nanoscale layer of titanium dioxide as preferred according to the invention) has a greater reflective aspect (or reflectivity) than that of the bare glass-ceramic (for example an increase in reflection in the visible of around 5 to 50 points relative to the bare glass-ceramic). Contrary to what might have been feared, any interactions between the glass-ceramic and the nanoscale layer defined according to the invention do not cause any disturbance or modification to the surface of the glass-ceramic (embrittlement, tensile stresses, change of crystalline state, modification of the thermal cycle or of the thermal endurance, etc.). From the process standpoint, the composition deposited does not differ from a conventional enamel and is completely compatible with existing production lines. In particular, it may be applied by screen printing using standard presses and fabrics, and it does not require additional heat treatment. Moreover, it does not have the drawbacks of an enamel (no weakening of the decorated face, no thickness control worries, no risk of tearing, etc.). Compared with thin layers deposited by magnetron sputtering, it is more economical and may be used with touch-sensitive controls, being advantageously electrically insulating. It is also compatible with all types of heating (in particular it withstands the high temperatures, of up to 700° C., of the radiant heating elements, is suitable for the magnetic fields of induction coils, etc.), unlike magnetron-sputtered layers and paints reserved for certain types of heating. It may also be deposited in any region of the plate (including the heater regions), in particular unlike paints.

The layer obtained has good aging resistance and good resistance to heat shocks, good mechanical strength properties (better than enamels), good resistance to abrasion and to staining, etc., consistent with the desired properties of glass-ceramic plates. It also has the same resistance to chemical attack and to soiling as conventional plates. The plate according to the invention also meets the requirements in terms of optical properties, safety properties, etc. Where appropriate, the presence of one or more crystalline phases is observed, particularly of the anatase type when the nanoscale layer is based on $TiO_2$ (anatase possibly being the only crystalline phase of said layer), in the layer obtained.

In one particularly preferred embodiment, the plate according to the invention is based on an opaque glass-ceramic (such as the plates sold under the name KERABLACK by Eurokera) coated with the defined layer according to the invention. In this case it is observed that the plate has, in the coated places, a highly metallized, mirror-like appearance, much shinier than in the case of conventional enamels or in the case of enamels producing interference effects.

In the case of a plate based on a transparent glass-ceramic (such as the plates sold under the name KERABISCUIT or KERAVANILLA by Eurokera) or a translucent glass-ceramic (such as the plates sold under the name KERAWHITE by Eurokera) coated with the defined layer according to the invention, the plate constitutes an advantageous alternative (for the reasons already mentioned) to transparent or translucent plates coated with magnetron-sputtered layers, the effect obtained, in particular in combination with an opacifying (especially black) paint pass, being metallized or glossy and, where appropriate, nacreous (or pearlized). In the case of a plate based on a transparent or translucent glass-ceramic, the defined layer according to the invention may in particular be intended for masking, at least partly, the underlying elements when they are not in use (such as heating elements and possible displays), while still allowing the heating elements and possible displays to be detected when they are in use.

The defined layer according to the invention may constitute the only coating on the plate or may be combined with other layers, as mentioned previously. In particular, it may be used with at least one opacifying paint layer (the preferred embodiment for transparent glass-ceramics and the embodiment providing an even glossier effect in the case of a translucent or black glass-ceramic), this paint layer being preferably on the underside of the plate (in the use position).

The paint layer or layers combined, where appropriate, with the nanoscale layer according to the invention are advantageously chosen so as to withstand high temperatures and to provide color stability and cohesion with the plate, and to do so without affecting the mechanical properties of the plate. Advantageously, they have a degradation temperature above 350° C., are generally based on one or more resins (such as a silicone resin, in particular one modified by incorporating at least one alkyd resin, or a polyimide, polyamide, polyfluorinated and/or polysiloxane resin, such as the Dow Corning® resins 804, 805, 806, 808, 840, 249, 409 HS and 418 HS, RHODORSIL® 6405 and 6406 from Rhodia, TRIPLUS® from General Electric Silicone, and SILRES® 604 from Wacker Chemie GmbH, etc.), and, where appropriate, they are loaded (for example with one or more pigments or dyes) and optionally diluted so as to adjust their viscosity, the diluent being, where appropriate, removed during their subsequent baking. The thickness of each paint layer may be between 1 and 100 microns (especially between 5 and 50 microns) and it may be applied by any suitable technique, such as brush deposition, doctor blade deposition, spraying, electro-static deposition, immersion, curtain coating, screen printing, etc. Preferably, according to the invention, it is deposited by screen printing, where appropriate followed by drying.

The defined layer according to the invention may also be combined with at least one enamel layer. Surprisingly, the enamel in superposition with the layer according to the invention (whether the enamel is deposited on the layer or the layer is deposited on the enamel) does not flake off, unlike the superposition of two enamel layers, which is not achievable. The enamel may be chosen from all enamels conventionally used for coating glass-ceramics and generally comprises at least one glass frit and pigments, and also a medium allowing it to be applied, and is generally, and preferably, according to the invention applied by screen printing.

As is apparent above, the defined nanoscale layer according to the invention may, particularly advantageously according to the present invention, thus serve as an underlayer for another layer, such as an enamel or paint layer, making it possible in particular, depending on the case, to increase the thicknesses, to juxtapose two types of decoration, to provide a sustained glossy effect, etc.

The defined layer according to the invention may be deposited on the top or bottom face of the plate. The other layer or layers used, where appropriate, in combination with the nanoscale layer, may be applied to the same face (on or under the nanoscale layer) or on the opposite face of the plate. When the nanoscale layer serves as underlayer, it may for example be applied as first layer in one or more regions where one or more spared or reserved areas (i.e. areas left for example by the screen-printing deposition technique) are optionally provided or made, and said spared areas and/or the first layer may be coated with at least one second layer so as to form contrasted regions or more pronounced effects.

It should be noted that, depending on the number of additional layers relative to the nanoscale layer according to the invention, they may be deposited successively before and/or after (i.e. in line with or subsequently to) ceramization, each deposition being generally followed by a heat treatment. It should also be noted that the layer according to the invention is, as defined according to the invention, preferably deposited before ceramization, but it may if required be deposited thereafter and/or by a method other than screen printing.

The plates according to the invention thus allow the production of novel decorations and attractive effects (contrasted effects, nacreous effects, etc.) in combination, where appropriate, with the other (conventional) coatings for glass-ceramics, the decorations possibly being thin or otherwise, regular (network, etc.) or otherwise, discontinuous or continuous, etc. and being produced in a simple manner and not having deleterious effects on the properties usually sought.

The plate according to the invention may, where appropriate, be provided (or associated) with one or more additional functional or decorative elements (frame, connector(s), cable (s), control element(s), display(s), for example what are called "7-segment" light-emitting diodes, electronic control panel with touch-sensitive controls and digital display, etc.). The plate according to the invention may where appropriate be mounted on an insulating support, inside which the one or more heating elements are placed, without an intermediate complex aiming to mask the interior of the apparatus from the user's view.

The invention also relates to the high-temperature-maintaining and/or cooking appliances (or devices) that include at least one plate according to the invention (for example cookers and set-in hot plates). The invention covers both cooking appliances having a single hob or plate and appliances having several hobs, each of these hobs having a single heater or multiple heaters. The term "heater" is understood to mean a cooking location. The invention also relates to hybrid cooking appliances, the hob(s) of which has (have) several types of heater. Furthermore, the invention is not limited to the manufacture of hobs for cookers or cooktops. The plates manufactured according to the invention may also be other plates (chimney inserts, fire wall, etc.) that have to be very insensitive to temperature variations.

The following example illustrates the present invention without however limiting its scope.

A black opaque glass-ceramic plate having two smooth faces was manufactured from a glass having for example the composition described in patent application FR 2 657 079.

This glass was melted at around 1600-1750° C. in an amount such that a glass ribbon was able to be rolled, from which ribbon glass plates with for example final dimensions of 56.5 cm×56.5 cm×0.4 cm were cut.

The plates were coated by screen printing on their upper face with a composition, in the form of a screen-printable stable gel, based on an organometallic titanium compound (such as titanium tetraiso-propanolate) that is a precursor of titanium dioxide, on an organic binder, and on a dilution medium based on glycol ether and glycol acetate, using conventional polyester screen-printing fabrics, at places indicating for example the heaters, the displays and decorative regions.

The plates were then dried at around 100-150° C., the thickness of the layer after drying being for example 2 µm, and were then ceramized on ceramic trays according to a cycle as described in patent application FR 2 657 079.

Glass-ceramic plates of pleasing and novel esthetic appearance were obtained, this plate having an opaque matt black background region concealing the underlying structural elements of the cooking appliance and including patterns of glossy appearance (for example a rather silvered mirror appearance) formed by the nanoscale layer of titanium dioxide obtained (possibly containing impurities introduced by the heat treatment) which also concealed the underlying elements when not in use, while enabling them to be seen when they were in operation.

The plates according to the invention may especially be used advantageously to produce a novel range of hobs for cookers or cooktops.

The invention claimed is:

1. A glass-ceramic plate to cover or accommodate at least one heating element, wherein said plate is at least partly coated with at least one nanoscale layer based on a metallic material having a refractive index greater than the refractive index of the glass-ceramic and wherein the nanoscale layer comprises at least 95% by weight of the metallic material.

2. The glass-ceramic plate according to claim 1, wherein the nanoscale layer serves as an underlayer for another layer.

3. The glass-ceramic plate according to claim 1, wherein the nanoscale layer is combined with at least one paint layer.

4. The glass-ceramic plate according to claim 1, wherein the nanoscale layer is combined with at least one enamel layer.

5. The glass-ceramic plate according to claim 1, wherein the nanoscale layer is obtained by screen printing.

6. A process for manufacturing the glass-ceramic plate according to claim 1, comprising applying a composition comprising at least one metallic material with a refractive index greater than at least one of the refractive index of the glass-ceramic and the refractive index of a precursor of said metallic material, and optionally an organic material for bonding the particles of said metallic material to the plate, to the precursor glass before ceramization.

7. A high-temperature-maintaining appliance, a cooking appliance, or a combination thereof, comprising the glass-ceramic plate according to claim 1 and one or more heating elements.

8. The glass-ceramic plate according to claim 1, serving as a cooking plate or hob.

9. The process according to claim 6, comprising screen printing a composition comprising at least one metallic material with a refractive index greater than at least one of the refractive index of the glass-ceramic and the refractive index of a precursor of said metallic material, and optionally an organic material for bonding the particles of said metallic material to the plate, to the precursor glass before ceramization.

10. The glass-ceramic plate according to claim 1, wherein the nanoscale layer based on a metallic material has a refractive index of at least 1.77.

11. The glass-ceramic plate according to claim 1, wherein the nanoscale layer based on a metallic material has a refractive index of at least 1.85.

12. The glass-ceramic plate according to claim 1, wherein the nanoscale layer based on a metallic material has a refractive index of at least 2.

13. The glass-ceramic plate according to claim 1, wherein the nanoscale layer based on a metallic material has a refractive index of at least 2.9.

14. The glass-ceramic plate according to claim 1, wherein the layer is a screen printed layer.

* * * * *